US009720842B2

(12) United States Patent
Dimitrov et al.

(10) Patent No.: US 9,720,842 B2
(45) Date of Patent: Aug. 1, 2017

(54) ADAPTIVE MULTILEVEL BINNING TO IMPROVE HIERARCHICAL CACHING

(71) Applicant: NVIDIA CORPORATION, Santa Clara, CA (US)

(72) Inventors: Rouslan Dimitrov, San Carlos, CA (US); Rui Bastos, Porto Alegre (BR); Ziyad S. Hakura, Gilroy, CA (US); Eric B. Lum, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 641 days.

(21) Appl. No.: 13/772,160

(22) Filed: Feb. 20, 2013

(65) Prior Publication Data

US 2014/0237187 A1   Aug. 21, 2014

(51) Int. Cl.
*G09G 5/36* (2006.01)
*G06F 12/0897* (2016.01)
*G06F 12/0811* (2016.01)

(52) U.S. Cl.
CPC ...... *G06F 12/0897* (2013.01); *G06F 12/0811* (2013.01); *G06F 2212/302* (2013.01); *G06F 2212/455* (2013.01); *G06F 2212/601* (2013.01)

(58) Field of Classification Search
CPC .......... G06T 1/60; G09G 5/395; G09G 5/393; G09G 5/001
USPC ....... 345/530, 531, 535, 537, 538, 543, 544, 345/545, 557, 558, 560
See application file for complete search history.

(56) References Cited

U.S. PATENT DOCUMENTS

| 6,999,100 | B1* | 2/2006 | Leather et al. ............... 345/611 |
| 7,564,456 | B1* | 7/2009 | Lindholm et al. ........... 345/426 |
| 8,125,489 | B1* | 2/2012 | Holmqvist et al. .......... 345/519 |
| 2004/0041817 | A1* | 3/2004 | Hunter .......................... 345/611 |
| 2007/0146378 | A1* | 6/2007 | Sorgard .................. G06T 15/00 345/581 |
| 2008/0034311 | A1* | 2/2008 | Aguaviva et al. ........... 715/771 |
| 2011/0080416 | A1* | 4/2011 | Duluk et al. ................ 345/506 |
| 2012/0017062 | A1* | 1/2012 | Goel ..................... G06F 9/3851 711/170 |
| 2013/0293544 | A1* | 11/2013 | Schreyer ............... G06T 15/005 345/426 |

* cited by examiner

*Primary Examiner* — Xiao Wu
*Assistant Examiner* — Sarah Lhymn
(74) *Attorney, Agent, or Firm* — Artegis Law Group, LLP

(57) ABSTRACT

A device driver calculates a tile size for a plurality of cache memories in a cache hierarchy. The device driver calculates a storage capacity of a first cache memory. The device driver calculates a first tile size based on the storage capacity of the first cache memory and one or more additional characteristics. The device driver calculates a storage capacity of a second cache memory. The device driver calculates a second tile size based on the storage capacity of the second cache memory and one or more additional characteristics, where the second tile size is different than the first tile size. The device driver transmits the second tile size to a second coalescing binning unit. One advantage of the disclosed techniques is that data locality and cache memory hit rates are improved where tile size is optimized for each cache level in the cache hierarchy.

22 Claims, 8 Drawing Sheets

ADAPTIVE MULTILEVEL BINNING TO IMPROVE HIERARCHICAL CACHING

BACKGROUND OF THE INVENTION

Field of the Invention

The present invention generally relates to three-dimensional (3D) graphics processing, and, more particularly, to adaptive binning to improve hierarchical caching.

Description of the Related Art

Computer generated images that include 2D and 3D graphics objects are typically rendered into the screen space of a display device using a graphics processing unit (GPU) with one or more multistage graphics processing pipelines.

A common practice in such graphics processing pipelines is to utilize a multilevel cache system to reduce latency when fetching data related to graphics objects that are being rendered. The first level cache level is called the level one (L1) cache and is typically a small, high speed memory closely associated with one or more pipeline stages of the graphics processing pipeline. The L1 cache usually has the lowest memory access latency of the various cache levels and contains data that the pipeline stages of the graphics processing pipeline access frequently or are likely to access in the near future. Increased performance is achieved when data are stored in the L1 cache at or before the time the data are accessed by the processor. A level two (L2) cache is typically a memory that is larger and slower than the L1 cache, but faster than system memory. Some cache systems may employ an intermediate level cache between the L2 and system memory that is configured as a frame buffer with latency and size somewhere between those of the L2 cache and system memory.

As graphics objects are rendered, data and attributes related to the graphics objects are transferred from the memory to the frame buffer for processing by early stages of the graphics processing pipeline. As the early stages of the pipeline process the data and attributes, the data and attributes are transformed and stored in the L2 cache for processing by intermediate stages of the graphics processing pipeline. Data and attributes in the L2 cache is then transformed by the intermediate stages of the pipeline and stored in the L1 cache for processing by later stages in the graphics processing pipeline. Typically, each individual graphics object is processed to completion by the graphics processing pipeline, with the associated data and attributes passing through the cache hierarchy, before the next graphics object is processed.

One drawback to this approach is that, although processing complete graphics objects may be efficient at early stages of the graphics processing pipelines, the L2 and L1 caches may have a relatively low hit-rate, reducing overall pipeline performance. In one example, the graphics processing pipeline could render two graphics objects that cover a significant portion of the screen space and have a large region of where the two objects overlap. The L2 and L1 caches could be optimized to process one portion of the screen space at a time. As the graphics processing pipeline renders the first graphics object, the L2 and L1 caches would be loaded with data and flushed multiple times as each screen portion covered by the first graphics object is rendered. As the graphics processing pipeline renders the second graphics object, the L2 and L1 caches would again be loaded with data and flushed multiple times as each screen portion covered by the second graphics object is rendered, even though many of the same screen portions would have been loaded into the caches and flushed before when rendering the portion of the first object in the overlap region. When rendering a scene that includes a significant quantity of graphics objects, it is conceivable that any given screen portion of the screen space may be loaded into cache and flushed multiple times as the graphics objects in the computer generated image are rendered. Such multiple loads and flushes of the same data into cache results in increased rendering times and increased power consumption. As a result, performance and efficiency are reduced.

As the foregoing illustrates, what is needed in the art is an improved technique for increasing efficiency in a hierarchical caching system.

SUMMARY OF THE INVENTION

One embodiment of the present invention sets forth a method for calculating a tile size for a plurality of cache memories in a cache hierarchy. The method includes calculating a storage capacity of a first cache memory. The method further includes calculating a first tile size based on the storage capacity of the first cache memory and one or more characteristics of data being processed in a first portion of a graphics processing pipeline and transmitting the first tile size to a first coalescing binning unit. The method further includes calculating a storage capacity of a second cache memory. The method further includes calculating a second tile size based on the storage capacity of the second cache memory and one or more characteristics of data being processed in a second portion of the graphics processing pipeline, where the second tile size is different than the first tile size. The method further includes transmitting the second tile size to a second coalescing binning unit.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing device configured to implement one or more aspects of the disclosed methods.

One advantage of the disclosed techniques is that data locality and cache memory hit rates are improved where tile size is optimized for each cache level in the cache hierarchy. Increased hit rates improve performance of the graphics processing pipelines, thereby reducing render times.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
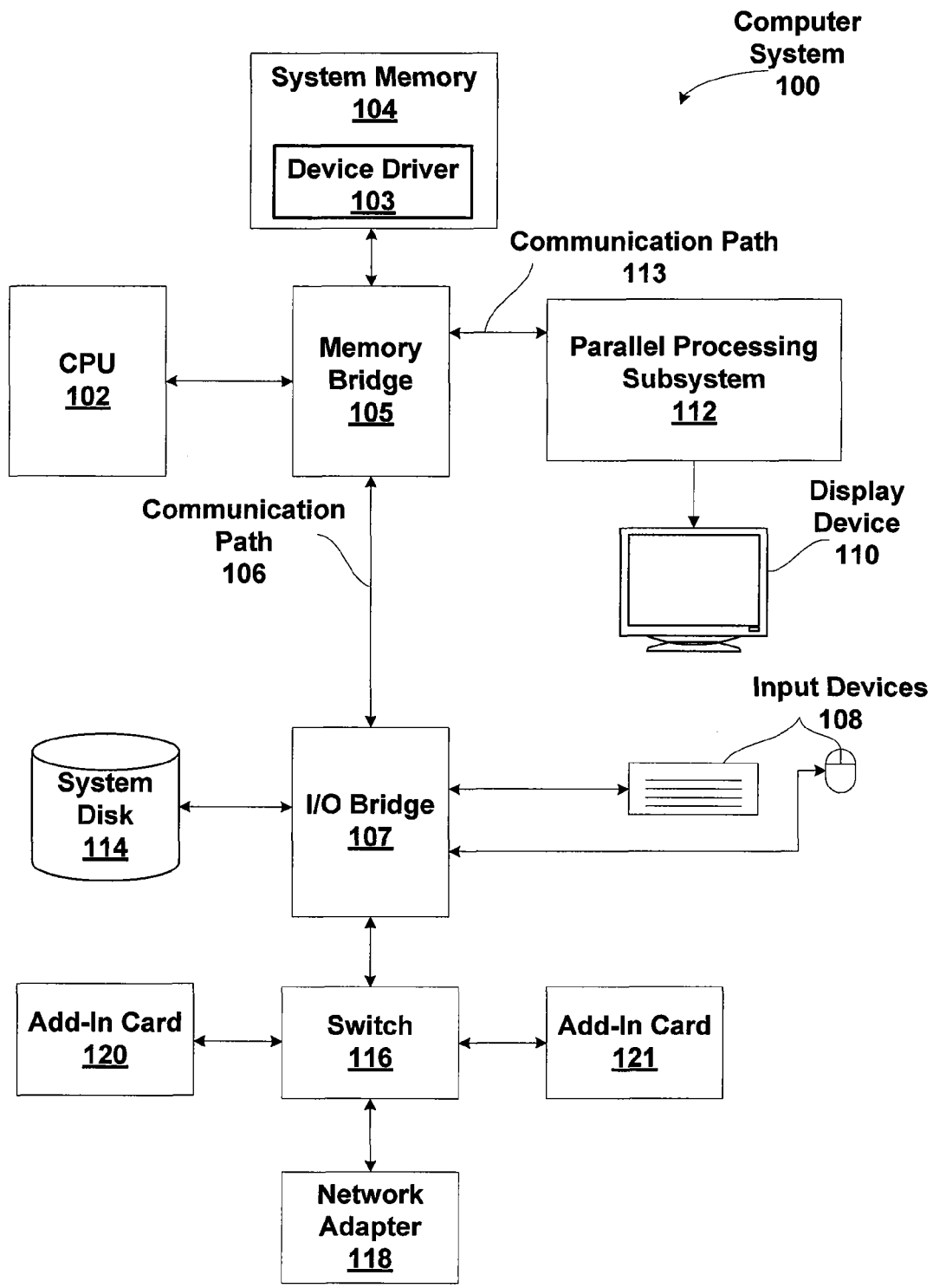
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
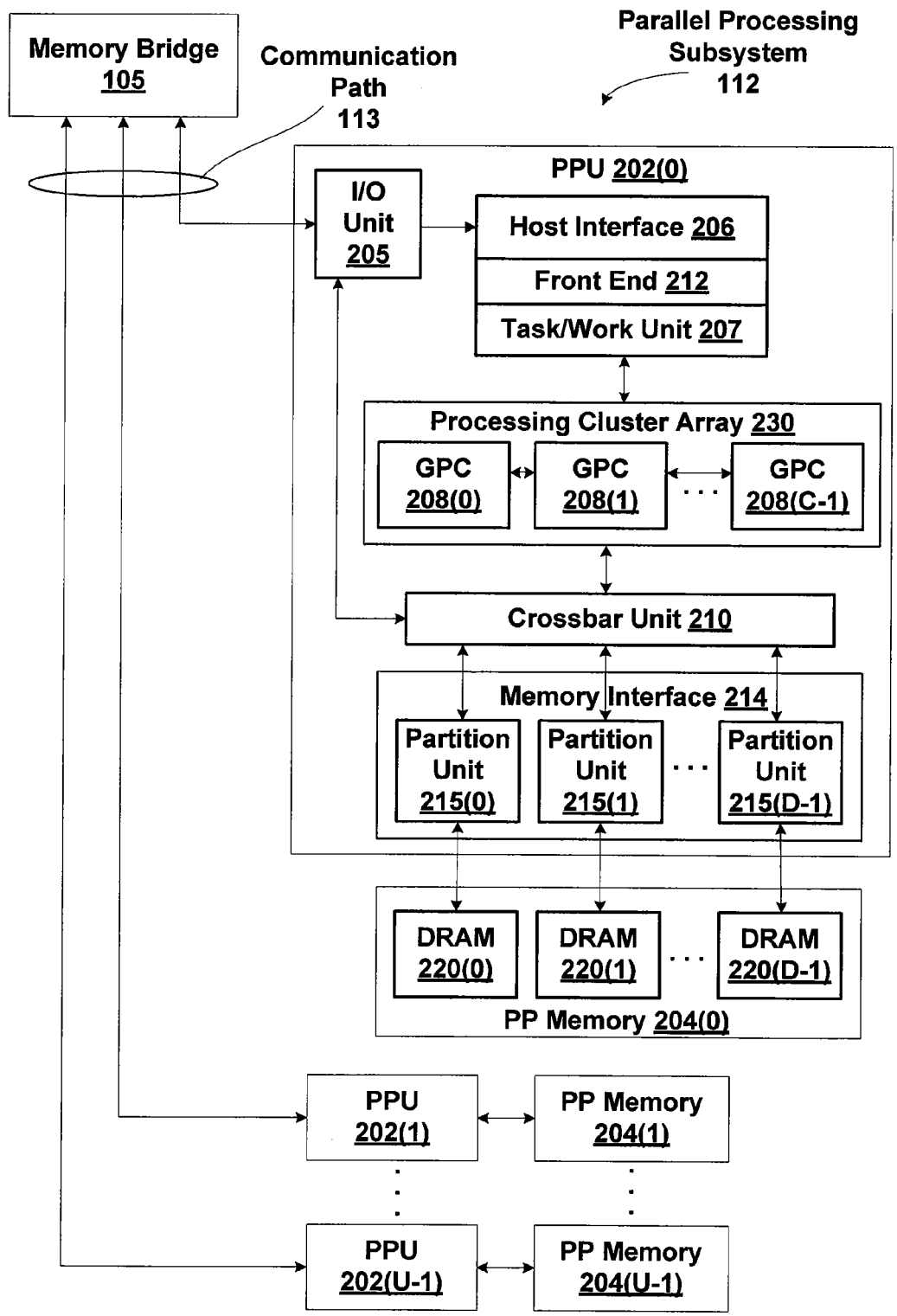
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where $D \geq 1$. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3A:
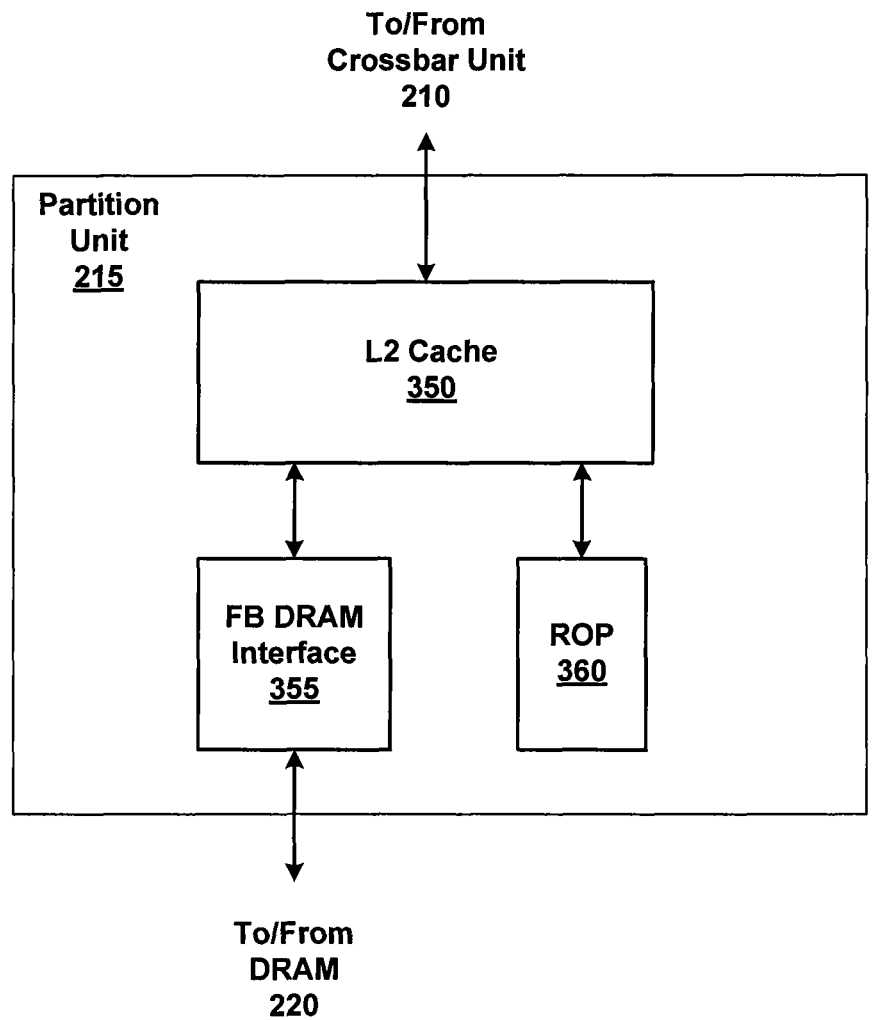
FIG. 3A is a block diagram of a partition unit within one of the PPUs of FIG. 2, according to one embodiment of the invention.

FIG. 3A is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Figure 3B:
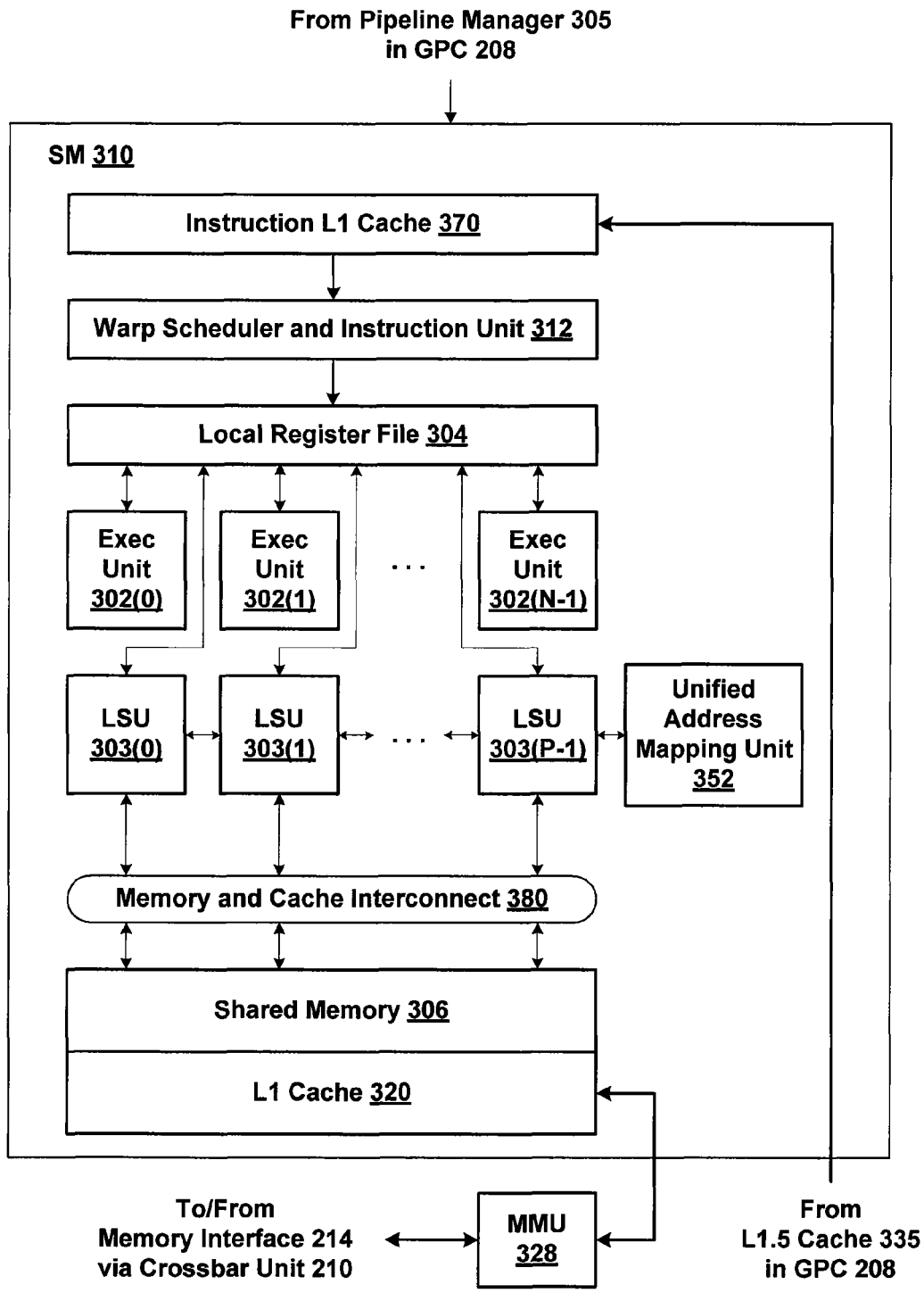
FIG. 3B is a block diagram of a portion of a streaming multiprocessor (SM) within a general processing cluster (GPC) of FIG. 2, according to one embodiment of the present invention.

FIG. 3B is a block diagram of a portion of a streaming multiprocessor (SM) 310 within a general processing cluster (GPC) 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes M streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by task metadata (TMD) (not shown) (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue 525. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
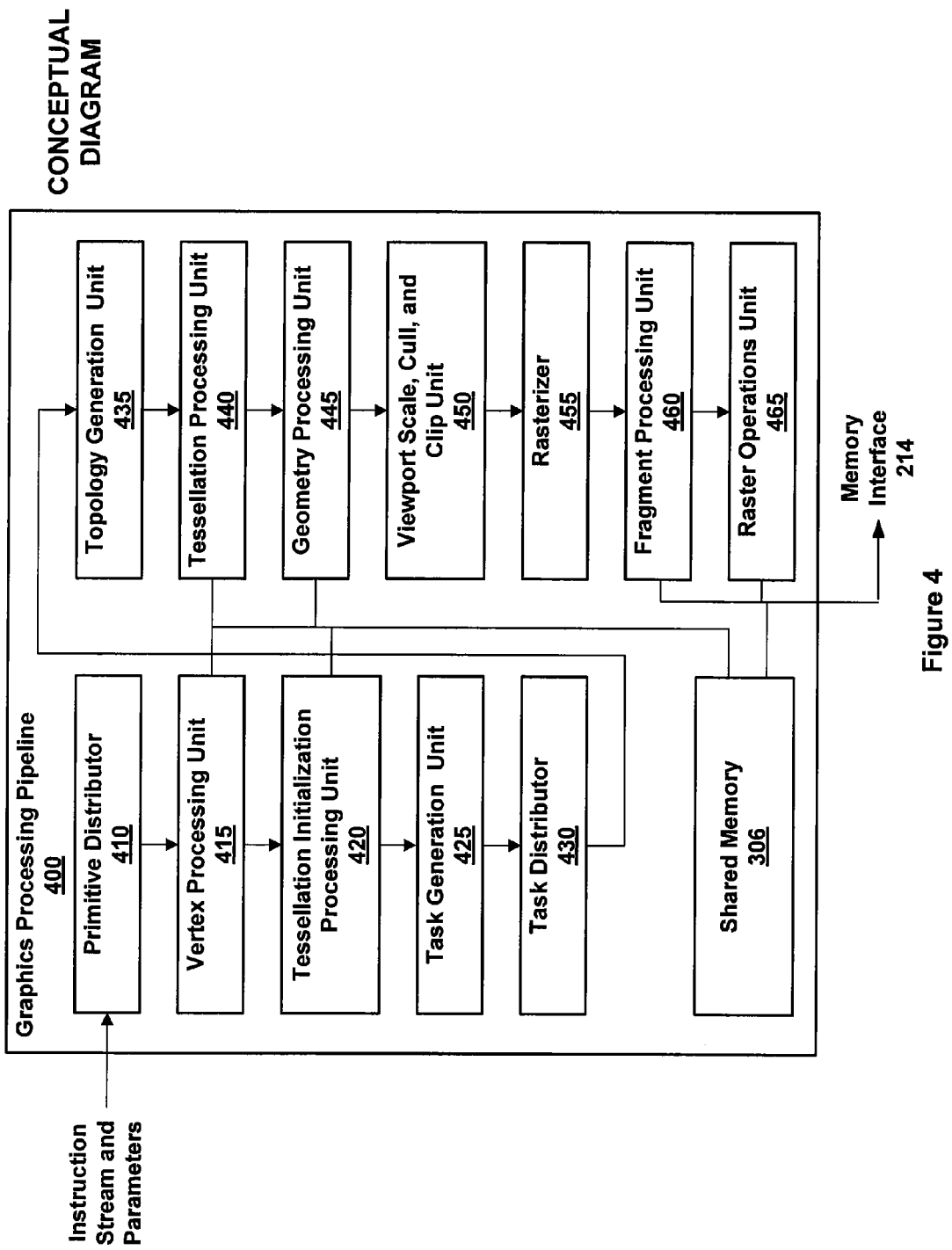
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a tessellation initialization processing unit 420, a tessellation processing unit 440, a geometry processing unit 445, and a fragment processing unit 460. The functions of primitive distributor 410, task generation unit 425, task distributor 430, topology generation unit 435, viewport scale, cull, and clip unit 450, rasterizer 455, and raster operations unit 465 may also be performed by other processing engines within a GPC 208 and a corresponding partition unit 215. Alternately, graphics processing pipeline 400 may be implemented using dedicated processing units for one or more functions.

The graphics processing pipeline also includes a shared memory 306 that is local to the graphics processing pipelines 400 within an SM 310. As further described below, inter-stage buffers (not shown) within the shared memory 306 are allocated and deallocated by the various processing units in the graphics processing pipeline 400 as needed. A processing unit reads input data from one or more inter-stage buffers, processes the input data to produce output data, and stores the resulting output data in one or more inter-stage buffers. A subsequent processing unit may read this resulting output data as input data for the subsequent processing unit. The subsequent processing unit processes the data and stores output data in one or more inter-stage buffers, and so on. The shared memory 306 and various other stages of the graphics processing pipeline connect with external memory via the memory interface 214.

The primitive distributor 410 processing unit collects vertex data for high-order surfaces, primitives, and the like, and outputs the vertex data, including the vertex attributes, to vertex processing unit 415. In some embodiments, the primitive distributor 410 includes a vertex attribute fetch unit (not shown) that retrieves the vertex attributes and stores the vertex attributes in the shared memory 306. The vertex processing unit 415 is a programmable execution unit that is configured to execute vertex shader programs, lighting and transforming vertex data as specified by the vertex shader programs. For example, the vertex processing unit 415 may be programmed to transform the vertex data from an object-based coordinate representation (object space) to an alternatively based coordinate system such as world space or normalized device coordinates (NDC) space. The vertex processing unit 415 may read data that is stored in shared memory 306, L1 cache 320, parallel processing memory 204, or system memory 104 by primitive distributor 410 for use in processing the vertex data. The vertex processing unit 415 stores processed vertices in the inter-stage buffers within the shared memory 306.

The tessellation initialization processing unit 420 is a programmable execution unit that is configured to execute tessellation initialization shader programs. The tessellation initialization processing unit 420 processes vertices produced by the vertex processing unit 415 and generates graphics primitives known as patches. The tessellation initialization processing unit 420 also generates various patch attributes. The tessellation initialization processing unit 420 then stores the patch data and patch attributes in the inter-stage buffers within the shared memory 306. In some embodiments, the tessellation initialization shader program may be called a hull shader or a tessellation control shader.

The task generation unit 425 retrieves data and attributes for vertices and patches from the inter-stage buffers of the shared memory 306. The task generation unit 425 generates tasks for processing the vertices and patches for processing by later stages in the graphics processing pipeline 400.

The task distributor 430 redistributes the tasks produced by the task generation unit 425. The tasks produced by the various instances of the vertex shader program and the tessellation initialization program may vary significantly between one graphics processing pipeline 400 and another. The task distributor 430 redistributes these tasks such that each graphics processing pipeline 400 has approximately the same workload during later pipeline stages.

The topology generation unit 435 retrieves tasks distributed by the task distributor 430. The topology generation unit 435 indexes the vertices, including vertices associated with patches, and computes texture coordinates corresponding to the vertices. The topology generation unit 435 then stores the indexed vertices in the inter-stage buffers within the shared memory 306.

The tessellation processing unit 440 is a programmable execution unit that is configured to execute tessellation shader programs. The tessellation processing unit 440 reads input data from and writes output data to the inter-stage buffers of the shared memory 306. This output data in the inter-stage buffers is passed to the next shader stage, the geometry processing unit 445 as input data. In some embodiments, the tessellation shader program may be called a domain shader or a tessellation evaluation shader.

The geometry processing unit 445 is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit 445 may be programmed to subdivide the graphics primitives into one or more new graphics primitives and calculate parameters, such as plane equation coefficients, that are used to rasterize the new graphics primitives.

In some embodiments, the geometry processing unit 445 may also add or delete elements in the geometry stream. The geometry processing unit 445 outputs the parameters and vertices specifying new graphics primitives to a viewport scale, cull, and clip unit 450. The geometry processing unit 445 may read data that is stored in shared memory 306, parallel processing memory 204 or system memory 104 for use in processing the geometry data. The viewport scale, cull, and clip unit 450 performs clipping, culling, and viewport scaling and outputs processed graphics primitives to a rasterizer 455.

The rasterizer 455 scan converts the new graphics primitives and outputs fragments and coverage data to fragment processing unit 460. Additionally, the rasterizer 455 may be configured to perform z culling and other z-based optimizations.

The fragment processing unit 460 is a programmable execution unit that is configured to execute fragment shader programs, transforming fragments received from the rasterizer 455, as specified by the fragment shader programs. For example, the fragment processing unit 460 may be programmed to perform operations such as perspective correction, texture mapping, shading, blending, and the like, to produce shaded fragments that are output to raster operations unit 465. The fragment processing unit 460 may read data that is stored in shared memory 306, parallel processing memory 204 or system memory 104 for use in processing the fragment data. Fragments may be shaded at pixel, sample, or other granularity, depending on the programmed sampling rate.

The raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory. In various embodiments, the ROP 465 may be located in the memory interface 214, in the GPCs 208, in the processing cluster array 230 outside of the GPCs, or in a separate unit (not shown) within the PPUs 202.

Adaptive Multilevel Binning to Improve Hierarchical Caching

Figure 5:
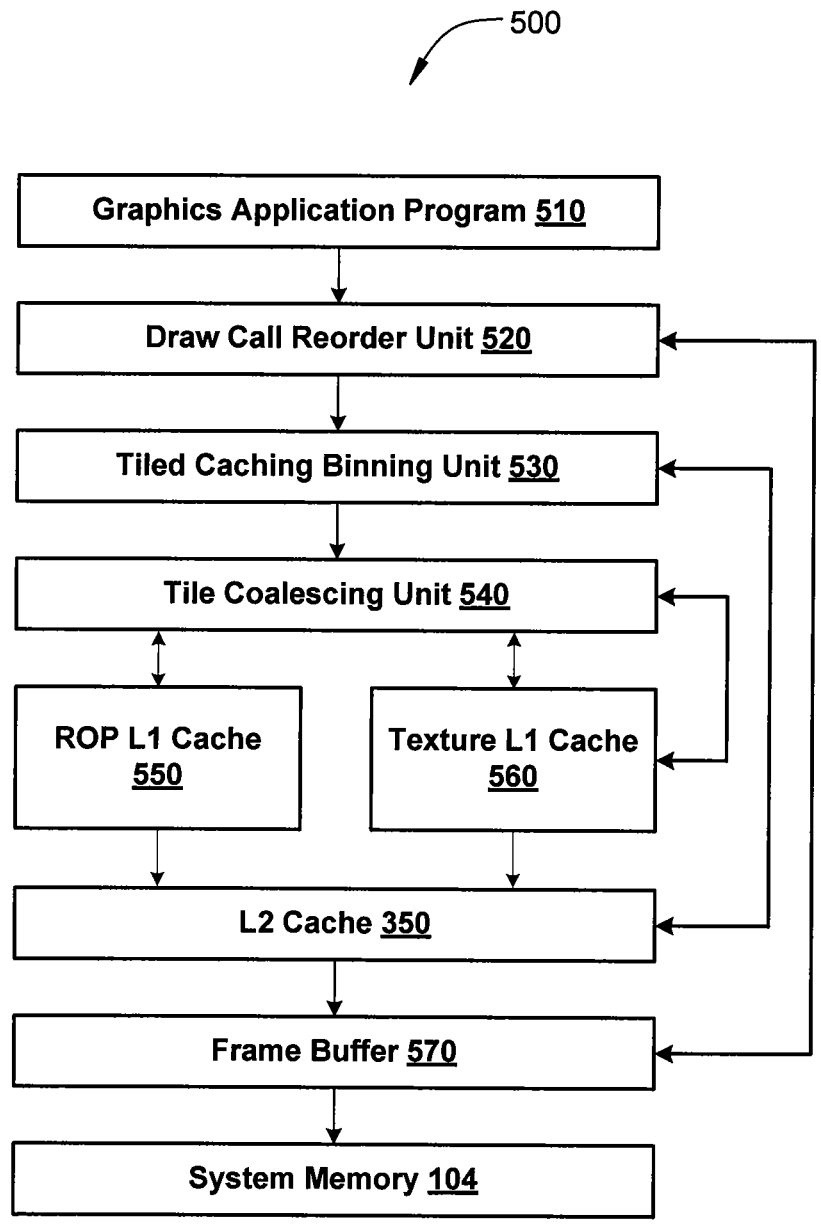
FIG. 5 illustrates a memory hierarchy associated with the parallel processing subsystem of FIG. 2, according to one embodiment of the invention.

FIG. 5 illustrates a memory hierarchy 500 associated with the parallel processing subsystem 112 of FIG. 2, according to one embodiment of the invention. As shown, the memory hierarchy 500 includes a graphics application program 510, draw call reorder unit 520, a tiled cache binning unit 530, a tile coalescing unit 540, a ROP L1 cache 550, a texture L1 cache 560, an L2 cache 350, a frame buffer 570, and a system memory 104. As further described below, the cache memories include data associated with graphics objects at various stages in the graphics processing pipeline 400 of FIG. 4. In one example, the frame buffer 570 could include data for the earlier stages of the graphics processing pipeline 400 from the primitive distributor 410 through the tessellation processing unit 440. The L2 cache 350 could include data for the middle stages of the graphics processing pipeline 400 from the geometry processing unit 445 through the rasterizer 455. The ROP L1 cache 550 and texture L1 cache could include data for the later stages of the graphics processing pipeline 400 from the fragment processing unit 460 through the raster operations unit 465.

The graphics application program 510 is a software application program that includes a set of graphics objects for rendering into one or more computer generated images for display. The graphics objects may be defined using any technically feasible graphic programming language. The graphics application program 510 defines the attributes of the graphics objects within the scene, the relationship of the graphics objects with respect to each other, texture maps that are used to cover the surface of various graphics objects, the position and attributes of light sources that illuminate the graphics objects, and the position and direction of a "camera" that defines which graphics objects are visible in a particular computer generated image. The graphics application program 510 creates one or more instructions that define how the graphics processing pipeline 400 renders the various graphics objects in a 3D scene. These instructions are called "draw calls." The graphics application program 510 sends these draw calls to the draw call reorder unit 520.

The draw call reorder unit 520 receives draw calls from the graphics application program 510 and sorts the draw calls to achieve better data locality and achieve a better hit rate in the frame buffer 570. In some embodiments, the graphics processing unit may have a relatively small frame buffer 570 that functions as a large cache for the system memory 104. In other embodiments, a computer graphics image may be rendered at an extremely high resolution that results in images many times larger than the capacity of the frame buffer 570. In cases such as these, the full set of draw calls may not fit into the frame buffer 570 simultaneously. The draw call reorder unit 520 may sort the draw calls into a new order or may group the draw calls in such a manner to create one or more working sets of draw calls. Each working set is constructed such that most or all of the working set, along with associated data such as textures and other attributes, fits into the frame buffer 570 simultaneously. As the first working set is loaded into the frame buffer 570, the device driver 103 may transfer various surface textures and other attributes associated with the first working set to the frame buffer 570. As the processing associated with the first working set completes, the next working set may be transferred to the frame buffer 570. The device driver 103 may then transfer various surface textures and other attributes associated with the second working set to the frame buffer 570. The graphics processing pipeline 400 processes the draw calls, resulting in graphics primitives, such as points, lines and triangles, for further rendering. The draw call reorder unit transfers these graphics primitives to the tiled cache binning unit 530.

The tiled cache binning unit 530 receives graphics primitives from the tiled cache binning unit 530 and sorts the graphics primitives to achieve better data locality and achieve a better hit rate in the L2 cache 350. The device driver 103 determines a cache tile size for the L2 cache 350. The tile size is selected such that data and attributes associated with the graphics primitives in a 3D scene that intersect with the tile fit into the L2 cache 350 simultaneously. The cache tile size may be expressed in screen dimensions, such as an X-dimension and a Y-dimension, and may be arbitrary in size. The cache tile size may be selected to occupy a portion of the total L2 cache 350, including, without limitation, one-third, one-half, or substantially all of the L2 cache 350. The device driver 103 determines the number of pixels that will fit in a given cache tile size based on the sum of the bytes per pixel in all enabled render targets and the anti-alias mode defined by the current render state. For example, if a graphics processing pipeline is configured with two render targets with four bytes per sample, a third render target with one byte per sample, and an anti-alias mode using four samples per pixel, the cache tile size would be based on (4+4+1)*4=36 bytes per pixel. In one embodiment, the tile size may be a non-linear function of the quantity of samples per pixel in determining the quantity of bytes per pixel. Some anti-alias modes may have better compression as the number of samples per pixel increases. For example, anti-aliasing with one, two, four, or eight samples per pixel could result in a factor of one, two, three, and five times the quantity of bytes per sample as determined from the enabled render targets. Choosing a tile size that fits into a fraction of the L2 cache 350 increases the likelihood that the data and attributes in the cache tile will remain in the L2 cache 350 for the duration of processing of the primitives associated with the cache tile. In one embodiment, the size of the cache tile may be adapted based on both the state of the graphics processing pipeline 400 and the configuration of the L2 cache 350. The graphics processing pipeline 400 processes the graphics primitives, resulting in fragments, such as picture elements (pixels) and texture elements (texels), for further rendering. The tiled cache binning unit 530 transfers these fragments to the tile coalescing unit 540 for further processing.

The tile coalescing unit 540 receives fragments from the tiled cache binning unit 530 and sorts the fragments to achieve better data locality and achieve a better hit rate in the raster operations (ROP) L1 cache 550 and texture L1 cache 560. The device driver 103 determines a cache tile size for the ROP L1 cache 550 and the texture L1 cache 560. The tile size is selected such that data and attributes associated with the fragments in a 3D scene that intersect with the tile fit into the ROP L1 cache 550 or the texture L1 cache 560 simultaneously. The ROP L1 cache 550 stores data for the raster operations unit 465 used in conjunction with various raster operations, including, without limitation, color raster operations (CROP) and z-raster operations (ZROP). The ROP includes data for samples related to pixels that are adjacent in screen space, where the data are stored in one or more render targets. The texture L1 cache 560 stores texel data for the various texture maps used by the graphics application program 510. The texels stored in the texture L1 cache 560 may be from a single texture map or from multiple texture maps. The texels stored in the texture L1 cache 560 may or may not be from adjacent texel locations from the source texture maps. The ROP L1 cache 550 and the texture L1 cache 560 have different optimal tile size calculations, as further described below. As such, the device driver 103 may calculate an optimal tile size for each of the ROP L1 cache 550 and the texture L1 cache 560, and select a single tile size based on a function of the two independent tile size calculations. For example, the device driver could choose the smaller of the two tile sizes, in order that either a ROP tile or a texture tile would fit in either the ROP L1 cache 550 or the texture L1 cache 560.

The ROP L1 cache 550 includes storage for one or more tiles, each of which includes a number of pixel samples. The ROP L1 cache 550 generally includes pixels for one render target at any given time. As such, the tile size for the ROP L1 cache 550 is selected based on the render target with the largest number of bytes per pixel. As such, the ROP L1 cache 550 can accommodate a given number of samples for any of the enabled render targets. For example, if the graphics processing pipeline is configured for one render targets with one byte per sample, three render targets with four bytes per sample, and one render target with eight bytes per sample, the tile size would be selected to accommodate the render target with eight bytes per sample. The tile size is further modified by the number of samples per pixel, based on the anti-alias mode, as described above.

The texture L1 cache 560 includes storage for one or more tiles, each of which includes a number of texels. The optimal tile size for the texture L1 cache 560 varies depending on various factors, including, without limitation, the number of graphics objects intersecting a tile, the resolution of texture maps accessed by those graphics objects, and the angle of the graphics objects to the screen surface. In some embodiments, the tile size for the texture L1 cache 560 may be heuristically selected based on, for example, on averaging the factors above across a given 3D graphics scene. In other embodiments, the tile size for the texture L1 cache 560 may be selected based on the tile size of the ROP L1 cache 550. In one example, the ROP L1 cache could include 2 kbytes of memory, organized as eight ROP tiles of 256 bytes each. The texture L1 cache 560 could also include 2 kbytes of memory. The texture tile size could be derived from the ROP tile size by dividing the cache capacity of 2 kbytes by a number of bytes based on the anti-alias mode and the render target with the highest number of bytes per sample. If the anti-alias mode uses four sample per pixel, and the largest render target stored eight bytes per pixel, each pixel would occupy 4*8=32 bytes. The resulting tile size would be $\sqrt{2048/32}=8$ pixels on a side for square tiles.

Although the ROP L1 cache 550 and the texture L1 cache 560 are sized to improve data locality, the graphics processing pipeline may access a pixel or texel that is not resident, causing a cache miss and a request for the pixel or sample from the L2 cache 350.

The L2 cache 350 includes data for graphics primitives in cache tiles as determined by the tiled cache binning unit 530. The L2 cache 350 also serves as the next level cache for the ROP L1 cache 550 and the texture L1 cache 560. Although the L2 cache 350 is sized to improve data locality, the graphics processing pipeline 400 may access data that is not resident in the L2 cache 350, causing a cache miss and a request for the data from the frame buffer 570.

The frame buffer 570 includes data for the working set of draw calls as determined by the draw call reorder unit 520. The frame buffer 570 also serves as the next level cache for the L2 cache 350. Although the frame buffer 570 is sized to improve data locality, the graphics processing pipeline 400 may access data that is not resident in the frame buffer 570, causing a cache miss and a request for the data from the system memory 104.

The system memory 104 is the main memory for the computer system 100 and is connected to the CPU 102 either directly or through a bridge, as described above in conjunction with FIG. 1. In some embodiments, the CPU 102 writes a stream of commands to a data structure that may be located in system memory 104. The stream of commands may represent draw calls to be processed by the graphics processing pipelines 400. The system memory 104 may also serve as the next level cache for the frame buffer 570.

In some embodiments, some of the hardware units may have access to certain detailed information about graphics objects, where the detailed information may be available only temporarily within the graphics processing pipeline 400. Such detailed information may include, without limitation, the orientation of a graphics primitive in space with respect to the screen surface of the display device 110. This detailed information may be used to optimally determine or modify the tile size for any of the coalescing binning units. For example, the tile coalescing unit 540 could estimate the quantity of texture sampling for a graphics primitive, in terms of texels accessed per pixel, based on the orientation of the graphics primitive in 3D space. If the graphics primitive is parallel to the screen surface, then a relatively small number of texels would be accessed per pixel, and the texel samples would be relatively local to each other. As a result, the tile size could be relatively large. In contrast, if the graphics primitive is oblique to the screen surface, then a relatively large number of texels would be accessed per pixel, and the texel samples could be relatively distant from each other. As a result, the tile size could be relatively large to accommodate the increased quantity of texel samples per pixel. The optimal tile size could then be determined as a function of the angle of the graphics primitive with respect to the screen surface.

Figure 6:
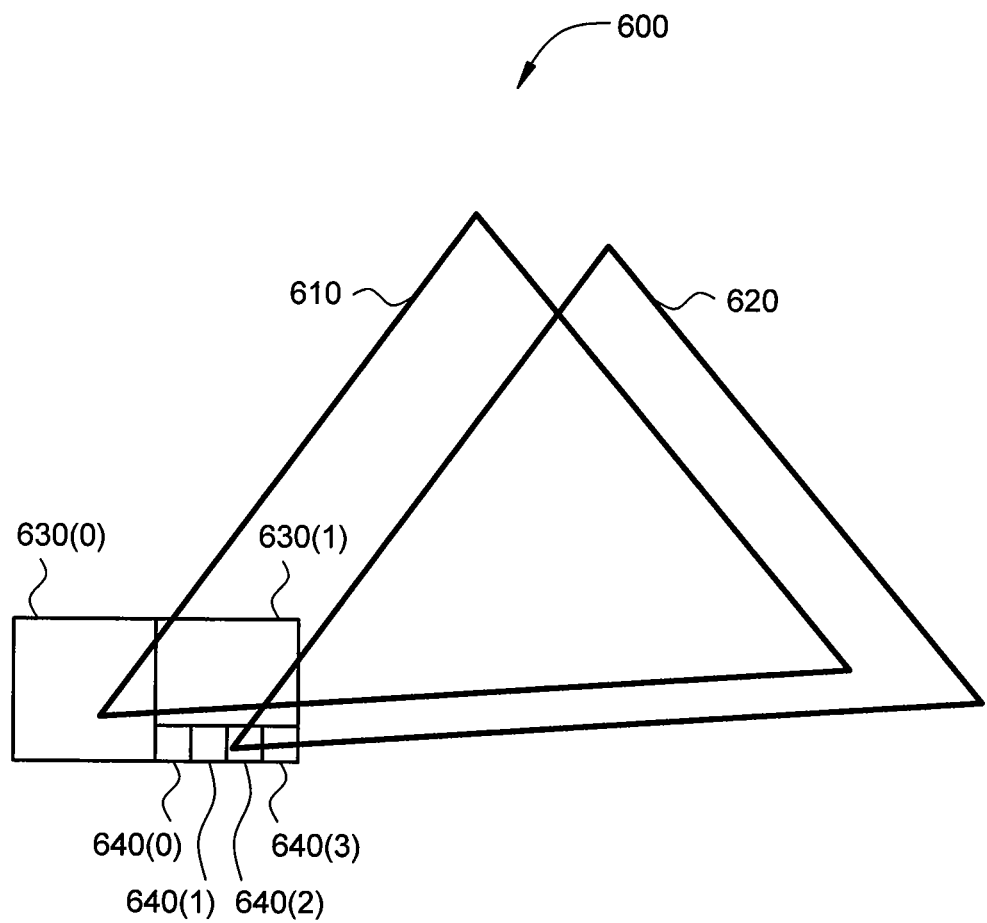
FIG. 6 illustrates a tile overlay map associated with the cache memories of FIG. 5, according to one embodiment of the invention.

FIG. 6 illustrates a tile overlay map associated with the cache memories of FIG. 5, according to one embodiment of the invention. As shown, the tile overlay map 600 includes a first graphics object 610, a second graphics object 620, L2 cache tiles 630, and ROP cache tiles 640.

The first graphics object 610 and the second graphics object 620 represent two graphics objects scheduled for rendering by the graphics rendering pipelines 400. The graphics application program 510 forms two draw calls, one draw call associated with each of the first graphics object 610 and the second graphics object 620. The graphics application program 510 sends the two draw calls to the draw call reorder unit 520. The draw call reorder unit 520 determines the order that the draw calls will appear in the frame buffer 570. If the draw call for the first graphics object 610 precedes the draw call for the second graphics object 620, then the draw call for the first graphics object 610 is processed first.

The L2 cache tiles 630 illustrate two tiles processed by the tiled cache binning unit 530 during the rendering of the first graphics object 610 and the second graphics object 620. When the tiled cache binning unit 530 processes L2 cache tile 630(0), data associated with the portion of the first graphics object 610 that intersects with L2 cache tile 630(0) are transferred to the L2 cache 350. No data associated with the second graphics object 620 are transferred, because the second graphics object does not intersect with L2 cache tile 630(0). The L2 cache tile 630(0) is then processed. When the tiled cache binning unit 530 processes L2 cache tile 630(1), data associated with the portion of the first graphics object 610 and the second graphics object 620 that intersect with L2 cache tile 630(1) are transferred to the L2 cache 350. The L2 cache tile 630(1) is then processed. As each L2 cache tile 630 is processed, data for one or both of the two graphics objects are transferred depending on whether either or both of the graphics objects intersect with the particular L2 cache tile 630.

The ROP cache tiles 640 illustrate four tiles processed by the tile coalescing unit 540 during the rendering of the first graphics object 610 and the second graphics object 620. When the tile coalescing unit 540 processes ROP cache tile 640(0), data associated with the portion of the first graphics object 610 that intersects with ROP cache tile 640(0) are transferred to the ROP L1 cache 550. No data associated with the second graphics object 620 are transferred, because the second graphics object does not intersect with ROP cache tile 640(0). The ROP cache tile 640(0) is then processed. The procedure is repeated for ROP cache tile 640(1). When the tile coalescing unit 540 processes ROP cache tile 640(2), data associated with the portion of the first graphics object 610 and the second graphics object 620 that intersect with ROP cache tile 630(2) are transferred to the ROP L1 cache 550. The ROP cache tile 630(2) is then processed. The procedure is repeated for ROP cache tile 640(3. As each ROP cache tile 640 is processed, data for one or both of the two graphics objects are transferred depending on whether either or both of the graphics objects intersect with the particular ROP cache tile 640.

It will be appreciated that the architecture described herein is illustrative only and that variations and modifications are possible. In one example, the techniques are described herein in the context determining tile sizes for multiple cache memories using software, such as the device driver 103. However, the described techniques could be employed where the tile sizes are determined by software, hardware or a combination of software and hardware. A hardware unit could detect various parameters, including, without limitation, render target configuration, anti-alias mode, whether a given render target is currently accessed, and the orientation of graphics objects with respect to the screen surface to determine an appropriate tile size. Alternatively, a software driver could calculate an initial tile size which is then modified by hardware based on such parameters. In another example, any one or more of the draw call reorder unit 520, the tiled cache binning unit 530, and the tile coalescing unit 540 could coalesce instructions and data for more than one cache memory, whether the cache memories are at the same or different cache levels in the cache hierarchy.

Figure 7:
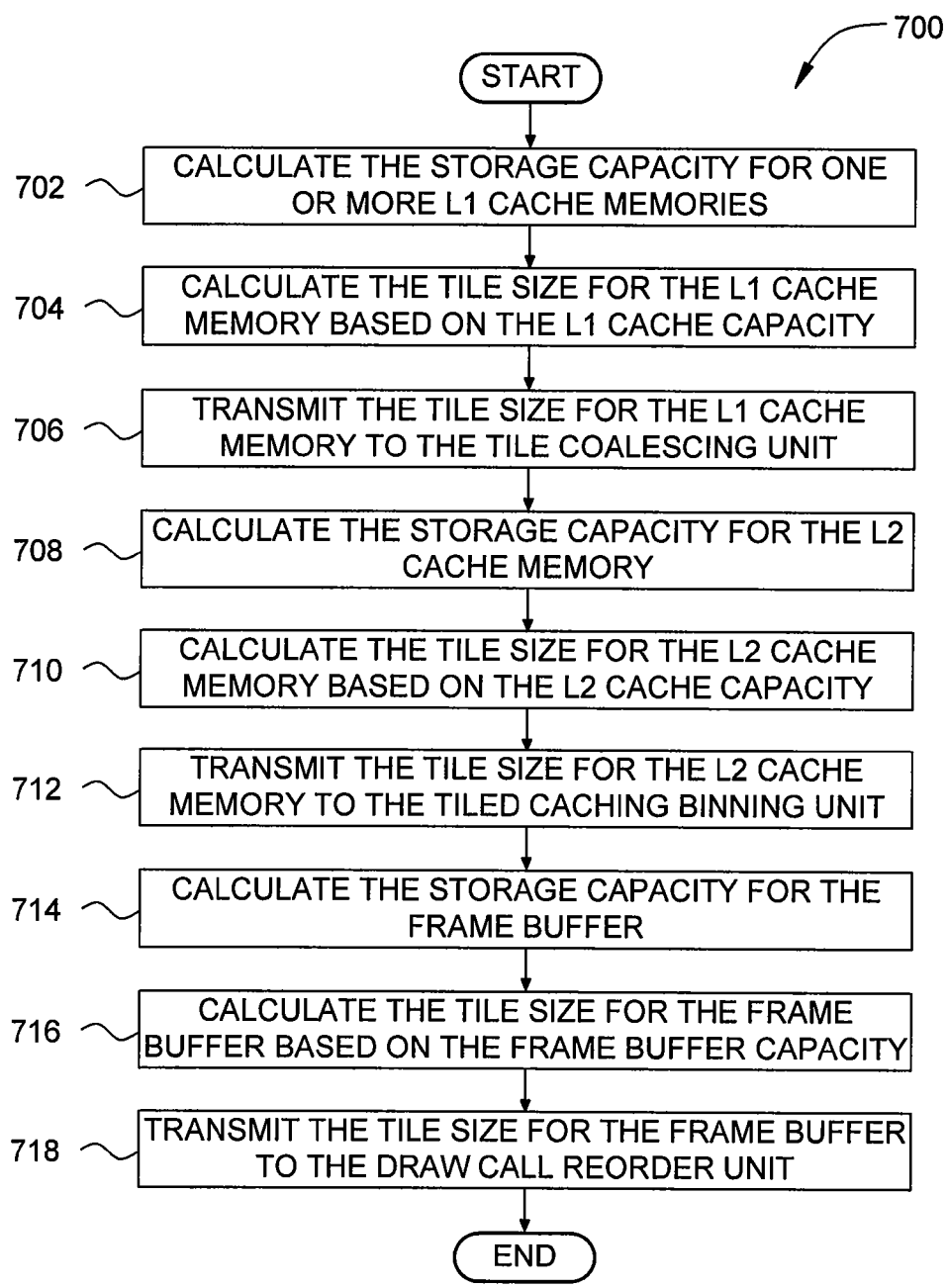
FIG. 7 sets forth a flow diagram of method steps for determining a tile size for multiple cache memories in a cache hierarchy, according to one embodiment of the present invention.

FIG. 7 sets forth a flow diagram of method steps for determining a tile size for multiple cache memories in a cache hierarchy, according to one embodiment of the present invention. Although the method steps are described in conjunction with the systems of FIGS. 1-5, persons of ordinary skill in the art will understand that any system configured to perform the method steps, in any order, is within the scope of the inventions.

As shown, a method 700 begins at step 702, where the device driver 103 calculates the storage capacity of one or more L1 cache memories. For example, the device driver 103 could calculate the storage capacity of a raster operations L1 cache memory 550, a texture L1 cache memory 560, or both of these cache memories. At step 704, the device driver 103 calculates the tile size for cache tiles associated with one or more L1 cache memories. The tile size may be based on a number of factors, including, without limitation, the storage capacity of one or more L1 cache memories, a quantity of samples per pixel associated with an anti-alias mode, a quantity of bytes per sample associated with one or more render targets, and a size of a texture element associated with a texture map. At step 706, the device driver 103 transmits the computed tile size for the L1 cache memories to the tile coalescing unit 540, in order that the tile coalescing unit 540 can create appropriately-sized cache tiles for the L1 cache memories.

At step 708, the device driver 103 calculates the storage capacity of the L2 cache memory 350. At step 710, the device driver 103 calculates the tile size for cache tiles associated with the L2 cache memory 350. The tile size may be based on a number of factors, including, without limitation, the storage capacity of the L2 cache memory 350, a quantity of samples per pixel associated with an anti-alias mode, a quantity of bytes per sample associated with one or more render targets, and a state parameter associated with a graphics processing pipeline. At step 712, the device driver 103 transmits the computed tile size for the L2 cache memory 350 to the tiled caching binning unit 530, in order that the tiled caching binning unit 530 can create appropriately-sized cache tiles for the L2 cache memory 350.

At step 714, the device driver 103 calculates the storage capacity of the frame buffer 570. At step 716, the device driver 103 calculates the tile size for cache tiles associated with the frame buffer 570. The tile size may be based on a number of factors, including, without limitation, the storage capacity of the frame buffer 570, the size of a draw call instruction associated with a graphics object, the size of a set of attributes defining the position of the graphics object, the size of a description of a light source configured to illuminate the graphics object, and the size of a texture map associated with the graphics object. At step 718, the device driver 103 transmits the computed tile size for the frame buffer 570 to the draw call reorder unit 520, in order that the draw call reorder unit 520 can create appropriately-sized cache tiles for the frame buffer 570. The method 700 then terminates.

In sum, multiple cache memories in a hierarchical caching system are each associated with a corresponding coalescing binning unit. Each cache memory includes data and attributes related to graphics objects being rendered by a graphics processing unit. A device driver determines an appropriate tile size for each cache memory. The tile size is dynamic and represents a portion of the screen space being rendered by units in the graphics processing pipeline associated the particular cache memory. The tile size may be based on the configuration of one or more render targets, the amount of state associated with each graphics object, and the number of texture elements accessed for a particular graphics object. The tile size may be modified based on additional information accessible to specific processing units within the graphics processing pipeline. In some cases, the tile size may be modified during rendering of one or more computer generated images.

One advantage of the disclosed techniques is that data locality and cache memory hit rates are improved where tile size is optimized for each cache level in the cache hierarchy. Increased hit rates improve performance of the graphics processing pipelines, thereby reducing render times.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for calculating a tile size for a plurality of cache memories in a cache hierarchy, the method comprising:

calculating a storage capacity of a first cache memory that resides at a first level in the cache hierarchy and is associated with a corresponding first coalescing binning unit;

calculating a first tile size based on the storage capacity of the first cache memory and a first set of characteristics of data being processed in a first portion of a graphics processing pipeline;

transmitting the calculated first tile size to the corresponding first coalescing binning unit;

calculating a storage capacity of a second cache memory that resides at a second level in the cache hierarchy and is associated with a corresponding second coalescing binning unit;

calculating a second tile size based on the storage capacity of the second cache memory and a second set of characteristics of data being processed in a second portion of the graphics processing pipeline, wherein the second tile size is different than the first tile size; and transmitting the calculated second tile size to the corresponding second coalescing binning unit.

2. The method of claim 1, wherein the first coalescing binning unit comprises a tile coalescing unit, and the first cache memory comprises a level 1 cache memory that stores fragment data associated with raster operations.

3. The method of claim 1, wherein the first coalescing binning unit comprises a tile coalescing unit, and the first cache memory comprises a level 1 cache memory that stores texture data associated with texturing operations.

4. The method of claim 1, wherein the first tile size is calculated based on at least one of a quantity of samples per pixel associated with an anti-alias mode, a quantity of bytes per sample associated with one or more render targets, and a size of a texture element associated with a texture map.

5. The method of claim 1, wherein the first tile size is modified by the first coalescing binning unit based on an angle of a graphics primitive with respect to a screen surface of a display device.

6. The method of claim 1, wherein the second coalescing binning unit comprises a tiled caching binning unit, and the second cache memory comprises a level 2 cache memory that stores graphics primitive data.

7. The method of claim 1, wherein the second tile size is calculated based on at least one of a quantity of samples per pixel associated with an anti-alias mode, a quantity of bytes per sample associated with one or more render targets, and a state parameter associated with a graphics processing pipeline.

8. The method of claim 1, further comprising:
calculating a storage capacity of a third cache memory that resides at a third level in the cache hierarchy and is associated with a corresponding third coalescing binning unit;
calculating a third tile size based on the storage capacity of the third cache memory and one or more characteristics of data being processed in a third portion of the graphics processing pipeline, wherein the third tile size is different than both the first tile size and the second tile size;
transmitting the third tile size to the corresponding third coalescing binning unit.

9. The method of claim 8, wherein the third coalescing binning unit comprises a draw call reorder unit, and the third cache memory comprises a frame buffer that stores draw call instructions associated with a 3D graphics scene.

10. The method of claim 8, wherein the third tile size is calculated based on at least one of a size of a draw call instruction associated with a graphics object, a size of a set of attributes defining the position of the graphics object, a size of a description of a light source configured to illuminate the graphics object, and a size of a texture map associated with the graphics object.

11. The method of claim 1, wherein the second set of characteristics comprises a second size of all data and attributes associated with a graphics primitive that intersects a second tile having the second tile size, wherein the second size is less than or equal to the storage capacity of the second cache memory.

12. The method of claim 1, wherein the first set of characteristics comprises a first size of all data and attributes associated with a graphics primitive that intersects a first tile having the first tile size, wherein the first size is less than or equal to the storage capacity of the first cache memory.

13. A non-transitory computer-readable medium including instructions that, when executed by a processor, cause the processor to calculate a tile size for a plurality of cache memories in a cache hierarchy, by performing the steps of:
calculating a storage capacity of a first cache memory that resides at a first level in the cache hierarchy and is associated with a corresponding first coalescing binning unit;
calculating a first tile size based on the storage capacity of the first cache memory and a first set of characteristics of data being processed in a first portion of a graphics processing pipeline;
transmitting the calculated first tile size to the corresponding first coalescing binning unit;
calculating a storage capacity of a second cache memory that resides at a second level in the cache hierarchy and is associated with a corresponding second coalescing binning unit;
calculating a second tile size based on the storage capacity of the second cache memory and a second set of characteristics of data being processed in a second portion of the graphics processing pipeline, wherein the second tile size is different than the first tile size; and
transmitting the calculated second tile size to the corresponding second coalescing binning unit.

14. The non-transitory computer-readable medium of claim 13, wherein the first coalescing binning unit comprises a tile coalescing unit, and the first cache memory comprises a level 1 cache memory that stores fragment data associated with raster operations.

15. The non-transitory computer-readable medium of claim 13, wherein the first coalescing binning unit comprises a tile coalescing unit, and the first cache memory comprises a level 1 cache memory that stores texture data associated with texturing operations.

16. The non-transitory computer-readable medium of claim 13, wherein the first tile size is calculated based on at least one of a quantity of samples per pixel associated with an anti-alias mode, a quantity of bytes per sample associated with one or more render targets, and a size of a texture element associated with a texture map.

17. The non-transitory computer-readable medium of claim 13, wherein the second coalescing binning unit comprises a tiled caching binning unit, and the second cache memory comprises a level 2 cache memory that stores graphics primitive data.

18. The non-transitory computer-readable medium of claim 13, wherein the second tile size is calculated based on at least one of a quantity of samples per pixel associated with an anti-alias mode, a quantity of bytes per sample associated with one or more render targets, and a state parameter associated with a graphics processing pipeline.

19. The non-transitory computer-readable medium of claim 13, further comprising the steps of:
calculating a storage capacity of a third cache memory that resides at a third level in the cache hierarchy and is associated with a corresponding third coalescing binning unit;
calculating a third tile size based on the storage capacity of the third cache memory and one or more characteristics of data being processed in a third portion of the graphics processing pipeline, wherein the third tile size is different than both the first tile size and the second tile size;
transmitting the third tile size to the corresponding third coalescing binning unit.

20. The non-transitory computer-readable medium of claim 19, wherein the third coalescing binning unit comprises a draw call reorder unit, and the third cache memory comprises a frame buffer that stores draw call instructions associated with a 3D graphics scene.

21. The non-transitory computer-readable medium of claim 19, wherein the third tile size is calculated based on at least one of a size of a draw call instruction associated with a graphics object, a size of a set of attributes defining the position of the graphics object, a size of a description of a light source configured to illuminate the graphics object, and a size of a texture map associated with the graphics object.

22. A computing device, comprising:
a memory including instructions; and
a processor that is coupled to the memory and, when executing the instructions, is configured to:
calculate a storage capacity of a first cache memory that resides at a first level in the cache hierarchy and is associated with a corresponding first coalescing binning unit;
calculate a first tile size based on the storage capacity of the first cache memory and a first set of characteristics of data being processed in a first portion of a graphics processing pipeline;
transmit the calculated first tile size to the corresponding first coalescing binning unit;

calculate a storage capacity of a second cache memory that resides at a second level in the cache hierarchy and is associated with a corresponding second coalescing binning unit;

calculate a second tile size based on the storage capacity of the second cache memory and a second set of characteristics of data being processed in a second portion of the graphics processing pipeline, wherein the second tile size is different than the first tile size; and transmit the calculated second tile size to the corresponding second coalescing binning unit.

* * * * *